July 29, 1952  W. B. ENSINGER  2,605,121
DRIVE WASHER
Filed May 12, 1950
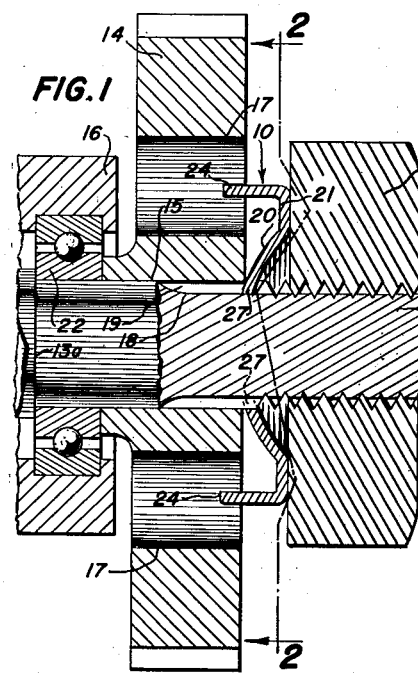
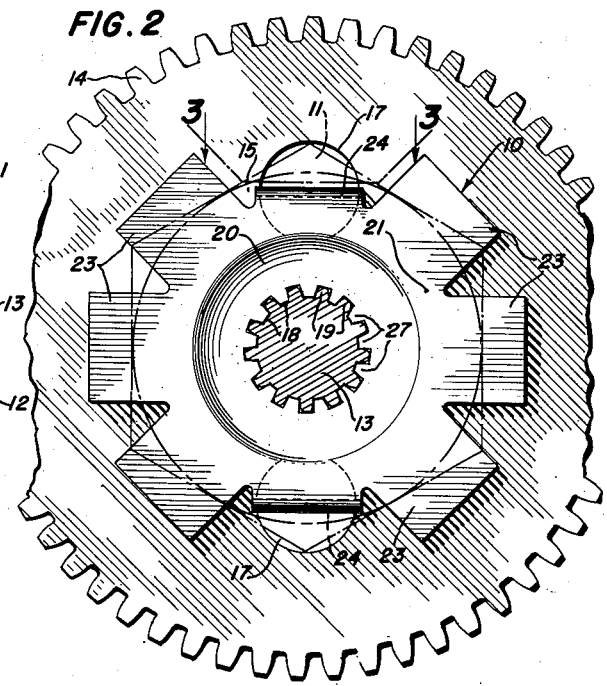
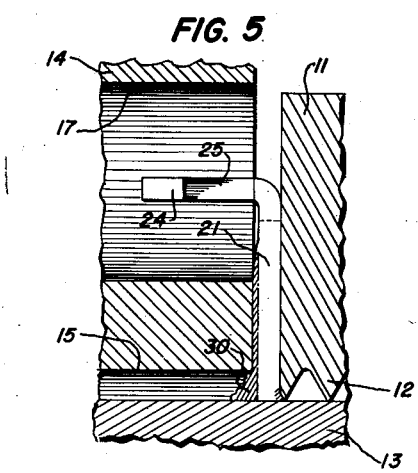
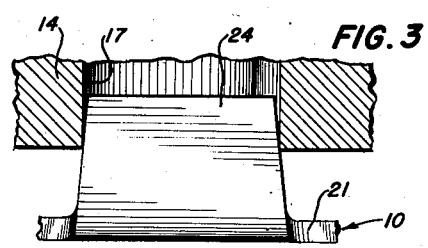
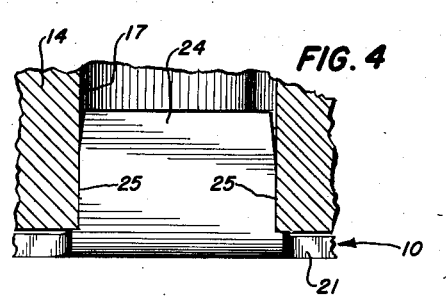
INVENTOR
WILLIS B. ENSINGER
BY
ATTORNEYS Patented July 29, 1952

2,605,121

UNITED STATES PATENT OFFICE 2,605,121

DRIVE WASHER

Willis B. Ensinger, Silver Spring, Md.

Application May 12, 1950, Serial No. 161,673

12 Claims. (Cl. 287—53)

(Granted under the act of March 3, 1883, as amended April 30, 1928; 370 O. G. 757)

This invention relates to improvements in rod joints and couplings and, as suggested by the title, consists of a washer which can produce a driving joint or coupling between two machine parts, and which will maintain that connection whether driving occurs in one direction of rotation or the other. The improved washer provides a positive means for attaching a part, for example the instant pinion with an unsplined hole to a splined shaft, with a backlash-free bond the latter being the result of causing the plastic flow of some of the washer substance into the interstices of the joint under axial compression of a nut.

It is often necessary in one or more instances in any mechanical contrivance to form a secure interlock between a shaft and the hub of a part carried by it. A familiar example of such an arrangement occurs in the case where a shaft and the hub of a pinion are intended to be secured very firmly so that neither will yield when the driving torque is applied either by way of the pinion or the shaft.

An equally familiar manner of doing the securing is through a key and keyways and less often through splines and splineways on the interfitting parts. The merits of these modes of securement cannot be disparaged because there will always be a need for one or the other in all types of machinery, and their purpose has been served so long and so well that each has become permanently established in the field. But there has been and is a need for a mode of fastening that stems from the side of simplicity and convenience and at the same time carries with it the assurance of an enduring connection.

Many times it is virtually impossible to mate a splined shaft with a broached hole in a pinion or the like with no backlash, especially in the small sizes employed in some of the types of machinery in mind herein. The underlying principle then is that the use of the instant washer relieves the users of devices which come with splined shafts of the necessity of being equipped with broaching tools capable of cutting matching internal splines or teeth in the rim of a hole in a pinion.

The center hole in the pinion, gear or the like, is left smooth and the serrations are formed in the hole of the drive washer. This serrated hole is in the center of a central dome and the serrations substantially match the splines and spline passages of the shaft when the washer is slipped in place. Later, when the dome is flattened under pressure, all inequalities occurring in the initial fit of the washer on the shaft disappear because of the conformation of the serrations to the shaft, in other words the plastic flowing of parts of the substance of the washer into all available crevices in the splineways around the splines. When the drive dogs are wedged into holes or slots in the pinion by the same force that causes the deformation of the washer, the foregoing backlash-free bond between the shaft and pinion will have been completed.

Sight has not been lost of some analogies in the related classes of driven, headed and screw threaded fastenings and of nut and bolt locks. In the first class the patent to A. B. Roe, Clutch for Binders, 1,675,277 of June 26, 1928 discloses a washer body called a clutch, with an internally toothed center cone. The teeth are intended to bite into a binder nail when the cone is collapsed, and stay with it.

The patent to C. G. Olson, Fastener Unit, 2,150,126 of March 7, 1939 in the same class discloses a screw shaft with splineways which serve the sole purpose of retainers for a lock washer that is slid on the shaft until it abuts the screw head, the protuberances which do the retaining being quite small so that they will shear.

The patent to D. Hoppenstand, Fastener With Lock Washer Attached, 2,257,959 of October 7, 1941, also in the same class, is on the order of preceding patent; the washer is internally tongued for preassembly on a screw or bolt, and although dished is not intended to be flattened to produce an interlock.

In the second class and in the patent to C. G. Olson, Locking Device, 1,896,679 of February 7, 1933, a lock washer does have laterally extending members or lugs which enter apertures in the work-piece, also twisted prongs which bite both into the work-piece and the flat, underside of the screw-head. The patent to C. G. Olson, Lock Washer, 1,938,399 of December 5, 1933 in the latter class, discloses both a flat and a dished washer, the preference for the dishing being the tension which it is asserted strengthens the locking connection with the fastening member and causes the load to be uniformly distributed over the entire washer.

While in some of these patents the factor of plastic flow occurs in the sense that where there is furrowing of metal there is plastic flow, in no case is the plastic flow utilized to obtain a backlash-free coupling, nor in any of said patents is there the deformation beyond the elastic limits of the washer metal to produce a plastic flow and, in turn, a bond with the respective confronting parts. The washers of said patents, true to their described purposes, are strictly lock washers which means that certain spring teeth, twisted slightly out of shape, must be cammed down in the act of tightening so that they will dig in on a reverse turn and so resist unscrewing.

In the light of these premises, it is an object of the invention to provide a drive washer to enable making a backlash-free joint between two revoluble machine parts that will insure against loosening of either one in respect to the other regardless of the particular direction of rotation.

Another object of the invention is to eliminate the necessity of splining the hole of a pinion which is to be coupled to a spline-ended shaft, the serrations that would have occurred in said hole being formed in the center of the dome of the drive washer, the deformation of the dome and consequent plastic flow of parts of the serrations into adjacent splineways, together with wedging of the washer drive dogs into the pinion, forming an enduring backlash-free joint.

Another object of the invention is to provide a drive washer which will establish its ultimate interlock without marring any of the confronting pressure surfaces.

Another but subsidiary object of the invention is to provide a drive washer wherein the teeth in the serrated annulus are numbered on the basis of enabling bending them over either a four or six-sided nut.

The foregoing objects and the attendant advantages of this invention will be readily appreciated in the light of the following detailed description when considered in connection with the accompanying drawings wherein:

Fig. 1 is a central, longitudinal section of a typical installation of the drive washer, the latter being in its initial state;

Fig. 2 is a section taken substantially on the line 2—2 of Fig. 1;

Fig. 3 is a detail cross section taken on the line 3—3 of Fig. 2, showing one of the drive dogs in its initial state;

Fig. 4 is a view similar to Fig. 3, showing the drive dog in its broached state; and Fig. 5 is an enlarged section of a portion of Fig. 1, showing the plastic flow resulting from the deformation of the central dome under pressure.

The driving washer generally designated 10, is formed from aluminum or some suitable equivalent substance, capable of yielding by plastic deformation to the pressure of the nut 11 when the latter is screwed home on the thread course 12 of the drive shaft 13 in the direction of the pinion 14. This particular pinion which often is quite small in practice, has a hub with a smooth hole 15 fitting on the drive shaft, and has two drive openings 17 shown in each of the views. It is in the latter openings (which could be slots) that the drive dogs of the washer engage. The thread course 12 is traversed by splineways 18 and splines 19. The spline formation stops immediately beyond the thread course.

It is the purpose of the instant washer to provide a positive means for attaching the pinion 14 to a splined shaft such as would be used in servomotors, synchros and equivalent mechanisms. In this use it is intended that the washer shall form a backlash-free connection between the shaft spline and the pinion without requiring that a spline be cut in the pinion hub. Said shaft and pinion are, respectively, herein identified as the drive member and the drivable member. The driving effort can be reversed, in which case the pinion would become the drive member. The special position of the pinion in the mechanism 16 of which the assembly is a part, is established by its abutment with one of the elements of said mechanism, for instance the inner ball-race 22, this, in turn, resting against a shoulder 13a of the shaft. The coupling of the pinion with the shaft may be made externally of the mechanism 16, that is to say before their assembly in said mechanism. To that end the pinion would be abutted against a solid anvil and the dome-deforming force applied to the washer from the other side by a tool with enough pressure behind it to insure the plastic flow of parts of the washer teeth into the splineways of the shaft.

For the accomplishment of these functions the washer 10 has a central, raised portion or spherical dome 20, arising from the washer body 21 which, for the purposes of this description, is an essentially flat piece. This flatness extends out into the annulus of relatively large tabs 23, the majority of which are, for convenience, called square. The exception to the squareness occurs in the diametrically and previously mentioned drive dogs 24 which, as shown in one instance in Fig. 3 are tapered.

Being tapered, the sides of the drive dogs lend themselves to a tight wedging in opposite sides of the holes 17 as at 25 in Fig. 4 when the pushing action of the nut 11 occurs. A center hole in the dome 20 is delineated by a perimeter of extending portions 27. These extending portions or teeth 27 fit the splineways 18 easily but firmly. To form them said teeth or lug 27 are broached in the finished shape of the washer, in other words after producing the dome 20. The result is that the transverse or through and through surfaces of the washer teeth will be parallel to and fit intimately against the splines 19 and the bottoms of the splineways 18. Although this fit is close the washer can be pushed on quite easily in place against the pinion 14 (Fig. 1). The drive dogs, being bent perpendicularly to the body 21 in the original formation of the washer, enter the drive holes and check the manual pushing of the washer when crowding begins.

Having emplaced the drive washer as in Fig. 1, the nut 11 is screwed home. As far as the drive dogs are concerned wedging into the holes occurs as the nut presses on the washer. The central dome 20 is deformed losing its spherical shape (Fig. 1) and becoming substantially flat as in Fig. 5. It is at this time that the important phase of the invention occurs. Since the serrated wall of the hole in the dome fits snugly against the splines and splineways of the shaft and the high part of the dome is abutted against the pinion (Fig. 1), the nut pressure produces the plastic deformation of the dome.

The shaded areas 30 (Fig. 5) show the metal flow of parts of the washer teeth in closing in around the shaft splines 19. This produces an enduring bond which under all ordinary circumstances will not yield under the driving torque. All backlash is eliminated, and this is of the utmost importance in any one of the types of mechanisms mentioned. After the nut 11 is screwed home, certain ones of the tabs 23 are bent forwardly against the sides of the nut to resist its unscrewing.

Modifications and variations of the present invention are possible in the light of the above teachings. It is therefore to be understood that within the scope of the appended claims the in- The invention described herein may be manufactured and used by and for the Government of the United States of America for governmental purposes without the payment of any royalties thereon or therefor.

What is claimed is:

1. A mechanism comprising a rotatable drive member and a drivable member fitted thereon so as to derive the driving effort, one of said members, for example a pinion, being abuttable with an element of said mechanism taking part in the eventual rotation of the drive and drivable members, thereby to determine the spacial position of said one member, means advanceable along the drive member in the direction of said one member to put said one member under axial compression, and a washer on the drive member, interposed between said one member and said advanceable means, yielding to plastic deformation under the axial compression to flow at some of its parts into the adjacent interstices of the drive member and drivable member to produce a mutual bond.

2. The combination of a drive member and a drivable member interfitted therewith so as to derive the driving effort, one of said members, for example a pinion, being abuttable with an element of a mechanism of which this combination is a part thereby to determine the spacial position of said one member, there being an opening in said one member, means advanceable along the drive member in the direction of said one member to put said one member under axial compression, and a washer on the drive member, interposed between said one member and said advanceable means, yielding to plastic deformation under the axial compression to flow at some of its parts into the adjacent interstices of the drive member and drivable member to produce a mutual bond, said washer having a drive dog, over-sized in respect to the opening, being forced thereinto under said axial compression to provide a wedge-fit.

3. A rod joint and coupling consisting of a drive shaft having an abutment and a thread course traversed by splineways producing a number of splines, a pinion slid on the shaft over the thread course and splines against the abutment, said pinion having an opening, a washer on the shaft having a dome with a central, serrated hole making a close interfit with the splines and splineways, said washer having a marginal driving dog bent toward the pinion and being over-size in respect to the pinion opening, and a nut screwed on the thread course against the washer to put the pinion under axial compression against the abutment, said washer succumbing to the axial compression by deformation of its dome, thereby forcing the serrations into the splineways and causing the plastic flow of parts thereof into adjacent interstices of the pinion and drive shaft to form a center bond, the axial compression of said nut forcing the driving dog into the opening to make a wedge-fit between the margin of the washer and the pinion.

4. A rod joint and coupling consisting of a drive shaft having an abutment and a thread course traversed by splineways producing a number of splines, a pinion slid on the shaft over the thread course and splines against the abutment, said pinion having an opening, a washer on the shaft, being of relatively thin material and having a dome with a central, serrated hole making a close interfit with the splines and splineways, said washer having a marginal driving dog bent toward the pinion and being laterally tapered so as to be oversize in respect to the pinion opening, and a nut screwed on the thread course against the washer to put the pinion under axial compression against the abutment, said washer succumbing to the axial compression by deformation of its dome, thereby forcing the serrations into the splineways and causing the plastic flow of parts thereof into adjacent interstices of the pinion and drive shaft to form a center bond, the axial compression of said nut forcing the driving dog into the opening to push broach the tapered sides and thereby make a wedge-fit between the margin of the washer and the pinion.

5. A washer for coupling two machine parts against rotation relative to each other when driving power is applied to either one of the parts in either of two directions, said washer consisting of a flat washer body having at least one driving dog bent perpendicularly from it, the sides of said dog being tapered to respond to a wedging action when forced into an opening in one of said machine parts, said body having a spherical dome struck up centrally thereof, said dome, in turn, having a central serrated hole, the serrations lying in the spherical contour of the dome and being matchable with splineways in the other machine part.

6. The combination of a spline-ended drivable shaft, a member, for example a pinion, having a smooth central hole fitting closely on the shaft over the splines and also having an opening offset from the central hole, and a washer on the shaft having a dog wedged tightly in said opening and having a central hole with teeth bonded to the splines by portions plastically deformed in the splineways.

7. A washer for coupling two machine parts one of which has splines and splineways the other of which has an opening, said washer consisting of a washer body having at least one driving dog situated perpendicularly to it, the sides of said dog being tapered to respond to a wedging action when forced into said opening, said body having a spherical dome struck up centrally thereof, said dome, in turn, having a central toothed hole the through and through surfaces of the teeth being parallel to the splines and splineways to provide an intimate surface contact.

8. A washer for coupling two machine parts against relative rotation and composed of a deformable material which is softer than the material of the machine parts, said washer comprising a substantially flat base, a laterally deformed central area formed on said base and having a hole therethrough, an extending portion formed on said deformed central area and directed toward the axis of the hole, said extending portion and central area of said washer being deformed by the assembly of said machine parts to securely engage the part adjacent the extending portion.

9. In a washer for providing a backlash-free coupling of two machine elements, a base, a driving dog formed on said base, a raised portion formed on said base and having a hole therein extending through said base, and a lug formed on said raised portion and extending into said hole.

10. A washer for coupling two machine parts comprising a base, a driving dog mounted on said base, said dog having tapered sides, a raised portion formed on said base and having a hole therethrough, and a plurality of teeth formed on said raised portion and radially extending into said hole toward the axis thereof.

11. A washer for coupling two machine parts comprising a base, a driving dog mounted on said base, said dog having tapered sides, said base having a raised portion struck out centrally thereof, said raised portion having a hole therethrough, and a lug formed on said raised portion and extending into said hole.

12. A washer for coupling two machine parts comprising a base, a driving dog formed on said base, said dog having tapered sides, a raised portion formed on said base having a hole therein extending through said base, and a lug formed on said raised portion and extending into said hole.

WILLIS B. ENSINGER.

REFERENCES CITED

The following references are of record in the file of this patent:

UNITED STATES PATENTS

| Number | Name | Date |
| --- | --- | --- |
| 1,356,404 | Robinson | Oct. 19, 1920 |
| 1,427,807 | Halbleib | Sept. 5, 1922 |
| 2,001,290 | Thomson | May 14, 1935 |
| 2,270,813 | Olson | Jan. 20, 1942 |